UNITED STATES PATENT OFFICE.

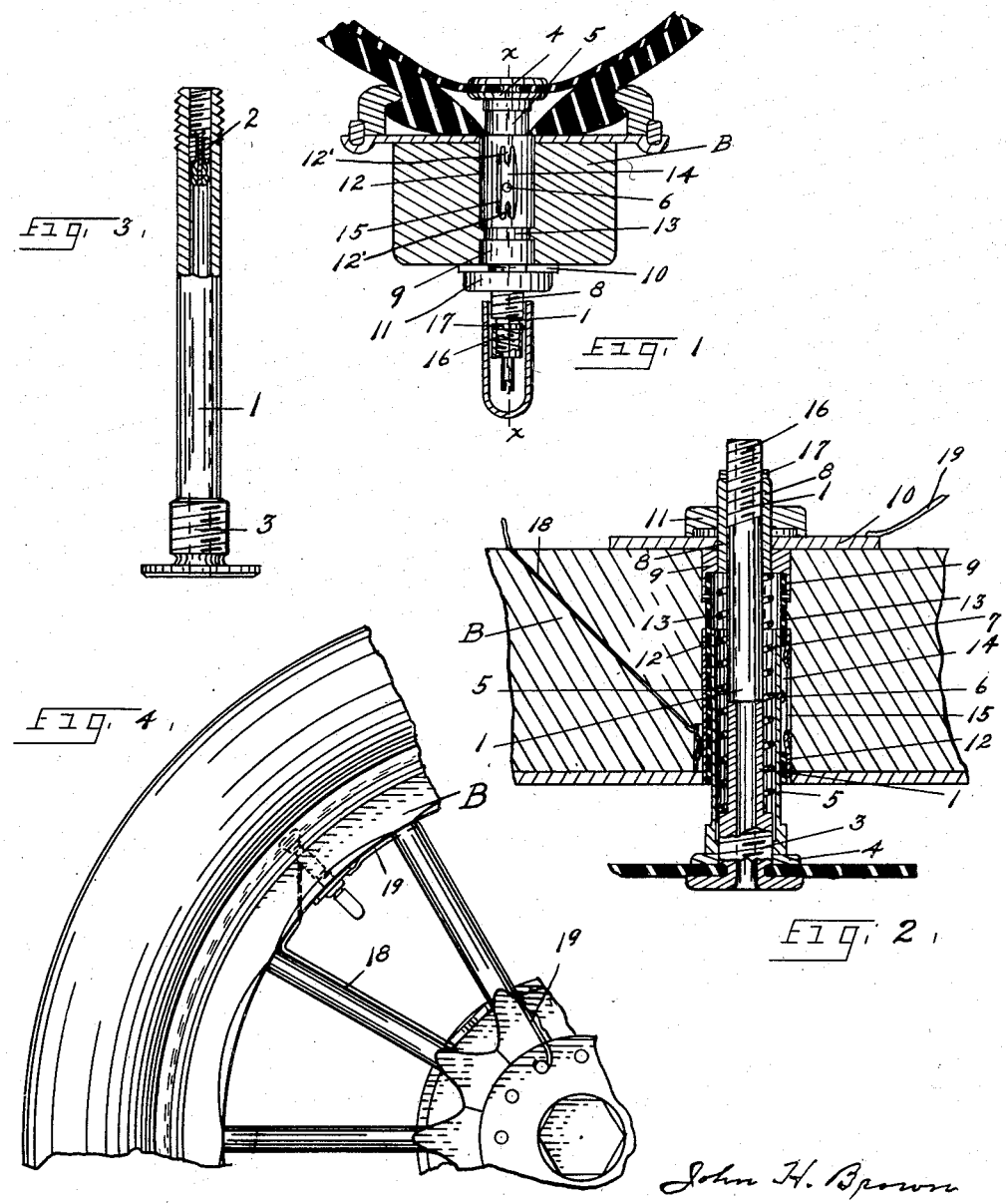

JOHN H. BROWN, OF MIDVALE, UTAH.

AUTOMATIC VEHICLE TIRE-SIGNAL.

1,137,116.  Specification of Letters Patent.  Patented Apr. 27, 1915.

Application filed December 11, 1913. Serial No. 806,105.

*To all whom it may concern:*

Be it known that I, JOHN H. BROWN, a citizen of the United States, residing at Midvale, in the county of Salt Lake and State of Utah, have invented certain new and useful Improvements in Automatic Vehicle Tire-Signals, of which the following is a specification.

My invention relates to pneumatic pressure signals, and has for its object to provide an automatic device whereby a signal will be given when the pressure of air in a vehicle tire is excessive, or when it falls below a predetermined amount. These objects I accomplish with the device illustrated in the accompanying drawings in which similar letters of reference indicate like parts throughout the several figures, and as described in the specification forming a part of this application and pointed out in the appended claims.

In the drawings in which I have shown a substantial embodiment of my invention, Figure 1 is an elevation thereof. Fig. 2 is a longitudinal section through the device on line *x x* of Fig. 1. Fig. 3 is an enlarged detail elevation of the air tube, parts in section. Fig. 4 is a fragmentary view in elevation of a wheel with the device in place thereon.

In filling vehicle tires of the pneumatic type it is desirable to have an automatic signal to indicate when the pressure of the air within the tire is so great that it will burst the tire. It is also very desirable to have an automatic signal to indicate when the pressure of air in said tires has fallen and the air escaped to such an extent that to continue to run the vehicle would cause injury to the tire.

The purpose of my invention is to provide and combine in one device, an air tube through which compressed air is supplied within the tire, with means to automatically give a signal when the pressure of air is above or below a predetermined amount.

In the drawings, the air tube is shown at 1, and has the usual means thereon for securing it on the outer periphery of an inner tube of an automobile tire with portions thereof entering the tire. Within said tube 1 is provided any of the well known air valves 2. A portion of said tube 1 near the base is externally threaded as at 3; and portions of the peripheric face of said threaded portion are cut away to hold a washer 4 against rotation. An internally threaded contact sleeve 5 is screwed on said tube 1, over the threaded portion 3, with other portions extending parallel with and surrounding a portion of said tube. A contact screw 6 is secured in the side of said sleeve 5. A spiral spring 7 is carried on said tube 1 within said contact sleeve 5 and with one end thereof bearing against the threaded portion 3 of said tube. A sleeve 8, externally threaded is slidable and carried on said tube 1 and bears against the other end of said spring 7. A jam nut 11 is screwed on said sleeve 8 to engage a plate 10, that is rigidly fastened to the felly of the wheel to hold the device in place. An adjusting nut 9 is screwed on said sleeve 8, and is provided with a projecting flange, to which an insulating sleeve 13, having a longitudinally disposed slot 14 therein, is fastened. Said insulating sleeve 13 is slidably operated over said contact sleeve 5 to insulate therefrom a contact member 12 which is fastened on and moves with said insulating sleeve. Any vertical or longitudinal movement of said sleeve 8 is imparted to said contact member 12. A longitudinally disposed, elliptical slot 15 is cut in the side of said contact member 12. A portion of said tube 1 is extended through the felly of the wheel and is externally threaded, as at 16, on which a tension nut 17 is screwed. The tension of said spring 7 is adjusted and held by nut 17. A wire 18 connects the said contact member 12 with the signal which is not shown, but may be in any of the well known forms of lights, bells or horns. Said signal may be in electric contact with any portion of the device and wheel except said contact member 12, and an electric circuit is completed when said member 12 is made to touch said contact screw 6. This may occur when the said inner tube of the wheel tire is unduly inflated or deflated. I have shown the other wire 19 as connecting said felly plate 10 with the hub of the wheel. As will be obvious any increase or decrease of air within the inner tube of the vehicle tire will move said tube 1 and all of the parts of my device rigidly connected therewith, namely, the contact sleeve 5 and screw 6. If said screw 6 is moved laterally in either direction within said slots 14 and 15 it will touch the portion of said contact member 12, shown at 12′ in Fig. 1, and complete an electric circuit and operate the signal.

Having thus described my invention I desire to secure by Letters Patent and claim:—

1. In a device of the class described the combination of an air tube; a contact sleeve secured on said air tube; a contact screw fastened in the side of said contact sleeve; a spring carried on said air tube and within said contact sleeve; an externally threaded sleeve within which said air tube is operated; an adjusting nut screwed on said last mentioned sleeve; an insulating sleeve fastened to said adjusting nut and within which said contact sleeve is operated and provided with a longitudinally disposed slot in the side; a contact member fastened on said insulating sleeve having a slot therein contiguous the slot in said insulating sleeve; and a jam nut screwed on said externally threaded sleeve to fasten the device to the felly of a wheel.

2. In a device of the class described the combination of an air tube; a contact sleeve secured on said tube; a detachable contact point on the face of said contact sleeve; an insulating member within which said contact sleeve is operated, having a slot therein within which said contact point is operated; a contact member fastened on said insulating member having a slot therein contiguous the slot mentioned; a spiral spring carried on said air tube and within said insulating member; an externally threaded member carried on said air tube and bearing against said spring; an adjusting nut thereon having a portion fastened to said insulating member; a felly plate; and a jam nut to hold said plate against said adjusting nut.

In testimony whereof I have affixed my signature in presence of two witnesses.

JOHN H. BROWN.

Witnesses:
M. G. THOMAS,
Mrs. G. C. BROWN.